(12) United States Patent
Weiss

(10) Patent No.: US 12,164,940 B1
(45) Date of Patent: Dec. 10, 2024

(54) COMPARTMENT CONFIGURATION INTERFACE MODULE AND A METHOD OF USE THEREOF

(71) Applicant: BHN Holding LLC, West Palm Beach, FL (US)

(72) Inventor: Joel Weiss, West Palm Beach, FL (US)

(*) Notice: Subject to any disclaimer, the term of this patent is extended or adjusted under 35 U.S.C. 154(b) by 0 days.

(21) Appl. No.: 18/389,350

(22) Filed: Nov. 14, 2023

(51) Int. Cl.
```
G06F 9/451      (2018.01)
G06F 3/0482     (2013.01)
G06F 3/0484     (2022.01)
G06Q 30/015     (2023.01)
G06Q 30/0601    (2023.01)
```

(52) U.S. Cl.
CPC ............ *G06F 9/451* (2018.02); *G06F 3/0482* (2013.01); *G06F 3/0484* (2013.01); *G06Q 30/015* (2023.01); *G06Q 30/0621* (2013.01); *G06Q 30/0643* (2013.01)

(58) Field of Classification Search
CPC ...... G06F 9/451; G06F 3/0482; G06F 3/0484; G06Q 30/0613; G06Q 30/0615; G06Q 30/0617; G06Q 30/0619; G06Q 30/0621; G06Q 30/015; G06Q 30/0643
See application file for complete search history.

(56) References Cited

U.S. PATENT DOCUMENTS

| | | | |
|---|---|---|---|
| 6,052,669 A * | 4/2000 | Smith | G06Q 30/0621 705/26.5 |
| 8,776,333 B2 * | 7/2014 | Van Den Bogart | A61G 17/08 283/67 |
| 2003/0172003 A1 | 9/2003 | Holbrook | |
| 2003/0208365 A1 * | 11/2003 | Avery | G06Q 30/0601 705/26.1 |
| 2015/0019367 A1 * | 1/2015 | Kline | G06Q 30/0621 705/26.5 |
| 2017/0140450 A1 * | 5/2017 | Ashby | G06Q 30/0643 |
| 2017/0337301 A1 * | 11/2017 | Tam | G06F 30/17 |
| 2018/0285790 A1 * | 10/2018 | Huynh | G06Q 30/0206 |

FOREIGN PATENT DOCUMENTS

| | | |
|---|---|---|
| CN | 114266618 A | 4/2022 |
| WO | 2013/049889 A1 | 4/2013 |

OTHER PUBLICATIONS

Jali, (website); https://jali.co.uk/; Date: Nov. 14, 2023.

* cited by examiner

*Primary Examiner* — Nicholas Ulrich
(74) *Attorney, Agent, or Firm* — Caldwell Intellectual Property Law

(57) ABSTRACT

A compartment configuration interface module, the compartment configuration interface module comprising a computing device configured to receive user data, generate one or more compartment modules as a function of the user data, receive compartment data associated with one or more compartment modules in response to an input from a user interface, generate one or more configuration parameters as a function of the compartment data and the input, select at least one configuration parameter of the one or more configuration parameters in response to the input from the user interface, generate a compartment data file as a function of the user data, the compartment data, and the at the at least one configuration parameter, generate a modified compartment data file as a function of the compartment data file, and transmit the compartment data file to a first end user.

18 Claims, 10 Drawing Sheets

Home

MyQuotes / Orders
MyVendors
Reports
Team
Notifications 02
Settings

500 →

Q Search

◎ Justin Ayaracfi

Shipping  ⓘ 1.Information  ⌂ 2.Order  ⌘ 3.Shipping  ✓ 4.Review  [Back] [Next]

How would you like to receive your order?

587         3420 LB
Total Cu. Ft.  Teel Weight

◉ Pickup    ○ Delivery

Cubitac Cabinetry

ⓘ Contact Info
  453 Broad Avene, RidgefielPNJ 07657
  Phone: 201313-2160
  Email: info@bergengrand.em ⓘ Business hours
  Mon - Fri 9:00 am - 7:00 pm
  Saturday: 10:00 am - 6:00 pm
  Sunday: 12:00 pm - 3:00 pm ⓘ Upcoming Holidays

Order Summary

| | |
|---|---|
| Purchase Order# | ASH17850147 |
| Requested Ship Date | 07/27/2020 |
| Items | 30 |
| Modification & Add-Ons | $0.00 |
| Upgrade | $0.00 |
| Discounts | $0.00 |
| Shipping | $0.00 |
| bb Ste | $75.00 |
| Tax | $0.00 |
| Order Total | $2220.00 |

ⓘ Requested dm will only be confirmed after approval of the quote.

504

Account
logout

FIG. 5

COMPARTMENT CONFIGURATION INTERFACE MODULE AND A METHOD OF USE THEREOF

FIELD OF THE INVENTION

The present invention generally relates to the field of user interfaces. In particular, the present invention is directed to compartment configuration user interface module.

BACKGROUND

Current systems utilized for configuration of one or more modules are lacking and do not provide adequate configurations in response to user feedback. In addition current systems require some human intervention, thereby preventing the process from being fully automated.

SUMMARY OF THE DISCLOSURE

In an aspect a compartment configuration interface module is described. The compartment configuration interface module includes a processor, and a memory communicatively connected to the processor, the memory containing instructions configuring the processor to receive user data, generate one or more compartment modules as a function of the user data and modify a user interface as a function of the one or more compartment modules to generate a graphical view, wherein the graphical view includes at least a display element generated as a function of the one or more compartment modules and a selectable graphic corresponding to a first selectable event handler, wherein the first selectable event handler is configured to trigger a first action if the first selectable graphic is selected. The processor is further configured to receive compartment data associated with one or more compartment modules in response to an input from the user interface, modify the user interface as a function of the compartment data, generate one or more configuration parameters as a function of the compartment data and the input, modify the user interface as a function of the one or more configuration parameters, select at least one configuration parameter of the one or more configuration parameters in response to the input from the user interface, generate a compartment data file as a function of the user data, the compartment data, and the at the at least one configuration parameter, generate a modified compartment data file as a function of the compartment data file and transmit the compartment data file to a first end user.

In another aspect a method of use for a compartment configuration interface module is described. The method includes receiving user data, generating one or more compartment modules as a function of the user data and modifying a user interface as a function of the one or more compartment modules to generate a graphical view, wherein the graphical view includes at least a display element generated as a function of the one or more compartment modules and a selectable graphic corresponding to a first selectable event handler, wherein the first selectable event handler is configured to trigger a first action if the first selectable graphic is selected. The method further includes receiving compartment data associated with one or more compartment modules in response to an input from the user interface, modifying the user interface as a function of the compartment data, generating one or more configuration parameters as a function of the compartment data and the input, modifying the user interface as a function of the one or more configuration parameters, selecting at least one configuration parameter of the one or more configuration parameters in response to the input from the user interface, generating a compartment data file as a function of the user data, the compartment data, and the at the at least one configuration parameter, generating a modified compartment data file as a function of the compartment data file and transmitting the compartment data file to a first end user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is yet another exemplary embodiment of a user interface in accordance with this disclosure;

FIG. 4 is yet another exemplary embodiment of a user interface in accordance with this disclosure;

FIG. 5 is yet another exemplary embodiment of a user interface in accordance with this disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for compartment configuration interface modules. In an embodiment compartment configuration interface module includes a processor and a memory communicatively connected to the processor.

Aspects of the present disclosure can be used to generate compartment data files through a user interface. Aspects of this disclosure can also be used to communicate with end users in association with one or more compartment data files. Exemplary embodiments illustrating aspects of the present disclosure are described below in the context of several specific examples.

Figure 1:
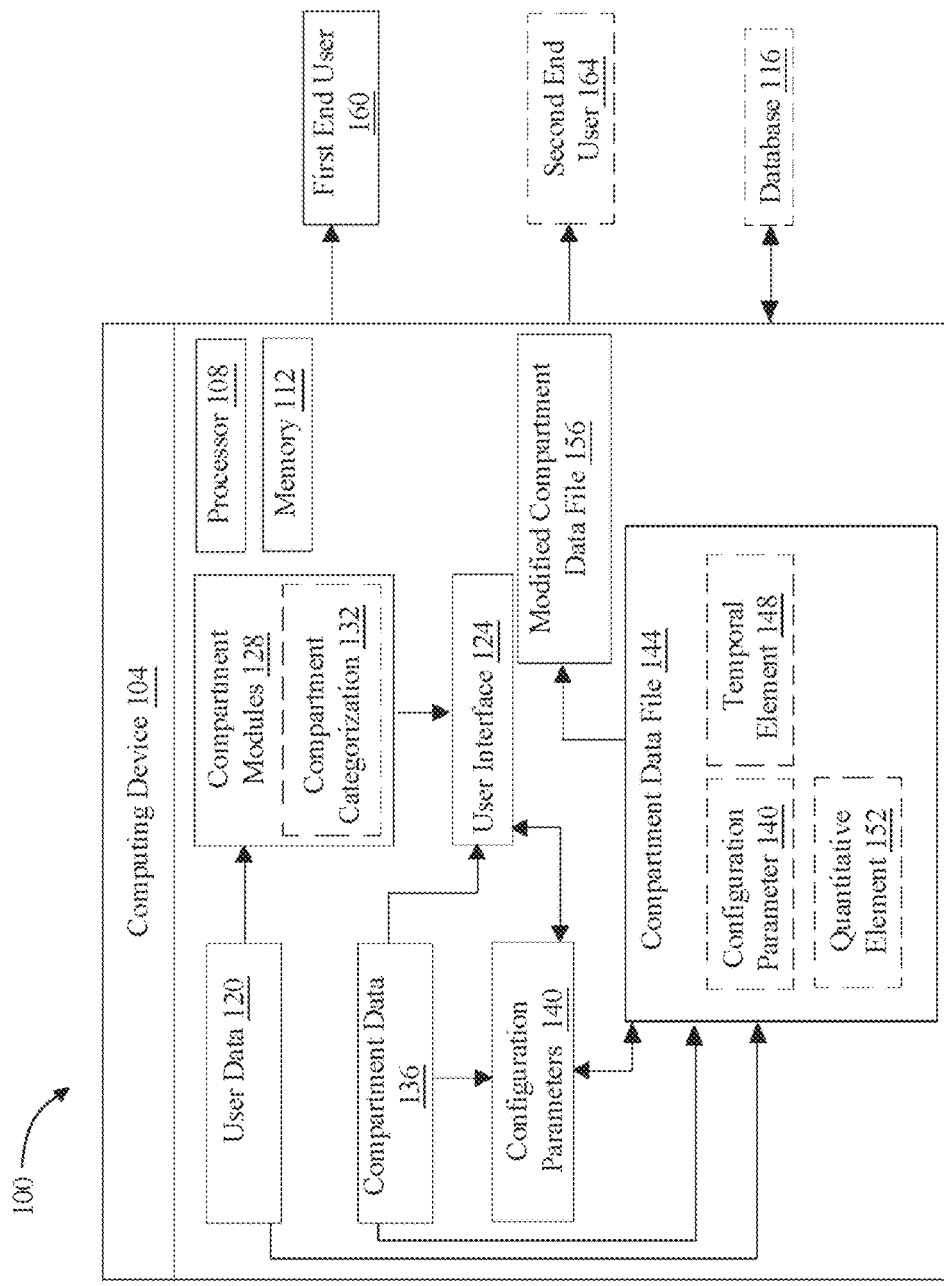
FIG. 1 is a block diagram of an exemplary embodiment of a compartment configuration interface module.

Referring now to FIG. 1, an exemplary embodiment of a compartment configuration interface module 100 is described. A "compartment" for the purposes of this disclosure is a section of a structure or a separate structure in which items can be placed. For example, compartment may include a dresser, a cabinet, a box, a storage unit, a sink, a bathtub, a cabinet under a sink and the like. "Compartment configuration" for the purposes of this disclosure refers to the modification or creation of a compartment. Compartment configuration may include selecting materials, determining dimensions, determining shapes and the like.

With continued reference to FIG. 1, compartment configuration interface module 100 includes a computing device 104. Compartment configuration interface module 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, compartment configuration interface module 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, compartment configuration interface module 100 may include a database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, processor 108 is configured to receive user data 120. "User data" for the purposes of this disclosure is information associated with a person or entity interacting with compartment configuration interface module 100. User data 120 may include a name, address, Tax identification number, phone numbers, associated entity's (e.g. name, address, and such of the company the user is working for) and the like. User data 120 may further include financial information (e.g. credit card numbers, debit card numbers, routing numbers for a bank account and/or any other information that may be used to transfer money from one individual or entity to another). In some cases, user data 120 may include information about an entity. "Entity" is an organization comprised of one or more persons with a specific purpose. An entity may include a corporation, organization, business, group one or more persons, and the like. In some cases, user data 120 may include identifying information about the entity such as a name, address, phone number, email address, and the like. In some cases, user data 120 may include information about an individual and their association with an entity. This may include, but is not limited to, the individuals' employment status, the individual's employment position, the individual's authority.

With continued reference to FIG. 1, user data 120 may further include information about an end user. "End user" For the purposes of this disclosure is a recipient of data generated computing device 104. End user may include an individual who may benefit from data generated by computing device 104. In some cases, end user may include a customer, a manufacturer, an employee within the same entity and the like. In some cases, end user may include an individual who may benefit from communication with the user in user data 120. In some cases, user data 120 may include information about an end user such as an address, an email address, an entity associated with the user, financial information associated with the user (e.g. credit card information, banking information and the like) and the like. In some cases user data 120 may include a quantitative identifier used to identify the end user. for example, user data 120 may include a purchase order number wherein the purchase order number may be used to identify the end user and any information processed by computing device 104 which may be associated with end user. In some cases, information associated with end user may be used to identify data generated during the current processing. For example, user data 120 may contain a quantitative identifier wherein the identifier may be used to receive data from a database 116 that was generated during a particular iteration. In some cases, compartment configuration interface module 100 may be configured to perform more than one iteration wherein each iteration may contain a quantitative identifier associated with an end user and the data generated. In some cases, data generated and/or received by computing device 104 may be stored in database 116 and retrieved from database 116. In some cases, the quantitative identifier may be used to identify a particular iteration. In some cases, the quantitative identifier may be used to associate a particular end user with data generated by a particular iteration. In some cases, user data 120 may further include information relating to the current iteration of the processing. For example, user data 120 may include the date in which computing device 104 generated a particular datum, a time, and the like.

With continued reference to FIG. 1, user data 120 may further include templates such as work order forms, invoices, contracts, and the like. In some cases, user data 120 may further include a logo associated with the person or entity. The logo may be used to associate a particular template to the user. In some cases, user data 120 may include a field of the user. The field may include the field the user is working in such as cabinet restoration, home remodeling, bathroom repairs and the like. In some cases user data 120 may include a particular project a user is working on such as a project involving cabinets, a project involving dressers, a project involving painting a house and the like. In some cases, user data 120 may further include a particular end user that the user would like to communicate with. For example, a user may indicate that they would like to communicate with a particular manufacturer, distributor, and the like.

With continued reference to FIG. 1, user data 120 may further include interactions a user may have with a user interface 124. For example, the clicking of a button by user, wherein the button may be representative of an action. In some cases, a user may interact with a user interface 124 wherein the actions may signify to processor 108 to process a particular task or action.

With continued reference to FIG. 1, user data 120 may be received from an input device. In some instances, input device may include compartment configuration interface module 100. In some instances, input device may include a remote device. In instances where user data 120 is input into a remote input device, remote device may transmit user data 120 across a wireless connection. In some embodiments, wireless connection may be any suitable connection (e. g., radio, cellular). In some instances, input device may include a computer, laptop, smart phone, tablet, or things of the like. In some instances, user data 120 may be stored in a data store and associated with a user account. It should be noted that data store may be accessed by any input device, using authorization credentials associated with user data 120. In some instances, user data 120 may be created and stored via a laptop and accessed from tablet, using authorization credentials. In some cases, processor 108 may be configured to receive authorization credentials such as a username and password wherein processor 108 may be configured to retrieve user data 120 associated with the username and password. In some cases, user data 120 may be retrieved from database 116. In some cases, database 116 may include a plurality of user data 120, wherein each user data 120 may be associated with a different person or entity. Processor 108 may be configured to receive a unique identifier wherein the unique identifier may be used to retrieve user data 120. In some cases, processor 108 may be configured to 'lookup' a particular user data 120 on a database 116. A "lookup table,"

for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include user data 120 and associated usernames and password.

With continued reference to FIG. 1, processor 108 is configured to generate one or more compartment modules 128 as a function of the user data 120. "Compartment module" for the purposes of this disclosure is information in the form of a data structure relating to a particular compartment. In some cases, compartment module 128 may include a visual depiction of a compartment such as an image, a video and the like. In some cases, compartment module 128 may include visual data. In some cases, each compartment module 128 may include an image associated with the compartment module 128, such as an image of a cabinet with a particular color. In some cases, each compartment module 128 may include the dimensions (e.g. length, width weight) of the compartment module 128. In some cases, each compartment module 128 may include information relating to a design on the compartment module 128 such as a raised panel, recessed panel, recessed shaker, arched recessed panel, arched raised panel, slab, beaded kitchen cabinet, shaker kitchen cabinet, base kitchen cabinets, wall cabinets and the like. In some cases, each compartment module 128 may include a color of each compartment such as shale, latte, sable, caramel, café, white, black, pink, grey, yellow, pastel, and the like. In some case each compartment module 128 may include a particular type of compartment such as a kitchen cabinet, a bathroom cabinet, a kitchen drawer, a bedroom dresser, a closet dresser, a two-door dresser, a two door cabinet, a sliding door cabinet, a sliding door dresser, a single door dresser, a cabinet with a full overlay, a cabinet with a partial overlay, a cabinet with inset doors, glass door cabinet, a cabinet with hingers doors, a cabinet with sliding doors and the like. In some cases, compartment module 128 may include information relating to any compartment that may be configured and/or modified. In some cases, one or more compartment modules 128 may include similar compartments from different manufacturers. In some cases, each compartment module 128 may include a unique identifier wherein the unique identifier may be used to identify a particular compartment module 128. In some cases, the unique identifier may include a name associated with the compartment. In some cases, the unique identifier may be used to distinguish similar compartments from differing manufacturers.

With continued reference to FIG. 1, at least one compartment of the one or more compartment modules 128 may include a compartment categorization 132. "Compartment categorization" for the purposes of this disclosure is a grouping of compartment modules 128 based having similar attributes. For example, compartment modules 128 having similar color characteristics may have a similar compartment categorization 132. Compartment categorizations 132 may include, but is not limited to, a particular end user (e.g. compartment modules 128 associated with a particular end user), one or more colors (compartment modules 128 having a similar color, such as for example, orange), a particular style, a particular design, a particular quality (e.g. wood, steel, quartz etc.) a particular Grade (e.g. premium grade cabinets made of high quality materials, medium quality cabinets made of lower quality materials and the like), a particular designation (e.g. cabinets for the kitchen, cabinets for the bathroom, cabinets for the garage and the like), a particular add-on (e.g. cabinets containing a garbage disposal or having the capability thereof, cabinets capable of containing shelves, and the like). In some cases, compartment categorizations 132 may be used to associate similar compartment modules 128 together. In some cases, compartment categorization 132 may be used to allow a user to sort through similar compartment modules 128. For example, a user looking for a particular cabinet style may sort through similar cabinets having the same cabinet style. In some cases, compartment categorization 132 may be used to allow a user to sort through particular end users, particular quality products and the like.

With continued reference to FIG. 1, generating one or more compartment modules 128 may include receiving one or more compartment modules 128 from database 116. In some cases, database 116 may be populated by a user, wherein a user may insert one or more compartment modules 128. In some cases, database 116 may be populated by one or more end users. For example, a particular end user associated with one or more compartment modules 128 may populate database 116. Continuing, a manufacturer may populate database 116 with their products and/or compartments wherein a user may select compartments associated with a particular end user. In some case, each compartment module 128 may include information associated with an end user, wherein a user may sort and/or select interact with compartment modules 128 associated with a particular end user.

With continued reference to FIG. 1, generating one or more compartment modules 128 may include generating one or more compartment modules 128 using a WebCrawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to compile one or more compartment modules 128. The web crawler may be seeded and/or trained with a reputable website, such as manufacture websites, websites that sell compartments and the like. A web crawler may be generated by computing device 104. In some embodiments, the web crawler may be trained with information received from a user through a user interface 124. In some embodiments, the web crawler may be configured to generate a web query. A web query may include search criteria received from a user. For example, a user may submit a plurality of websites for the web crawler to search to extract any data suitable for one or more compartment modules 128. In some cases, the web crawler may be configured to receive information associated with one or more particular compartment modules 128 wherein processor 108 may generate one or more compartment modules 128 and modify or update a database 116 with the one or more compartment modules 128.

With continued reference to FIG. 1, generating one or more modules as a function of user data 120 may include determining the authenticity of a user. For example, processor 108 may be configured to receive a username and password prior to displaying one or more compartment modules 128. In some cases, processor 108 may be configured to receive an input from a user through a user interface 124 to generate one or more compartment modules 128. In some cases, processor 108 may be configured to retrieve a plurality of compartment modules 128 wherein processor 108 may be configured to select one or more compartment modules 128 for a particular user. For example, processor 108 may be configured to select one or more compartment modules 128 within a particular geographic area as determined by the geographic area listed within user data 120. In some cases, processor 108 may be configured to generate one or more compartment modules 128 as a function of user data 120 wherein the compartment modules 128 are all associated with a particular end user. For example, user data 120 may indicate that a user would like to communicate with a particular end user wherein processor 108 may be configured to retrieve one or more modules associated with the end user. In some cases, user data 120 may include information about a particular compartment categorization 132 that a user is interested wherein processor 108 may be configured to retrieve one or more compartment modules 128 associated with the compartment categorization 132. For example, a user may indicate that they are interested in a particular cabinet wherein processor 108 may be configured to retrieve one or more compartment modules 128 with a similar compartment categorization 132. In some cases, processor 108 may submit a query to a database 116 to retrieve compartment modules 128 having a particular compartment categorization 132. In some cases, processor 108 may 'lookup' a particular end user and retrieve one or more modules associated with the user. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include a plurality of compartment modules 128 associated with one or more end users. Data within user data 120 may be used to retrieve a particular end user and lookup compartment modules 128 associated with the end user. Data within the lookup table may be received from database 116.

With continued reference to FIG. 1, processor 108 is configured to modify a user interface 124 as a function of one or more compartment modules 128. For the purposes of this disclosure, a "user interface" is a means by which a user and a computer system interact. For example a user may interact with a computer system through the use of input devices and software wherein user interface 124 may be configured to facilitate the interaction between the user and the computer system. A user interface 124 may include graphical user interface, command line interface (CLI), menu-driven user interface 124, touch user interface 124, voice user interface 124 (VUI), form-based user interface 124, any combination thereof and the like. In some embodiments, a user may interact with the user interface 124 using a computing device 104 distinct from and communicatively connected to processor 108. For example, a smart phone, smart tablet, or laptop operated by the user and/or participant. A user interface 124 may include one or more graphical locator and/or cursor facilities allowing a user to interact with graphical models and/or combinations thereof, for instance using a touchscreen, touchpad, mouse, keyboard, and/or other manual data entry device. A "graphical user interface," or "GUI" as used herein, is a user interface 124 that allows users to interact with electronic devices through visual representations. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. Persons skilled in the art, upon reviewing the entirety of this disclosure, will be aware of various ways in which a graphical user interface and/or elements thereof may be implemented and/or used as described in this disclosure. In some cases, graphical user interface may be modified as a function of a user interface data structure. For example, user interface data structure may include rules to generate one or more interaction components to be displayed visually by the graphical user interface. In some cases, graphical user interface may visually present data contained within user interface data structure wherein changes in user interface data structure may result in changes to elements visually displayed in graphical user interface. In some cases, processor 108 may be configured to modify graphical user interface as a function of the user interface data structure.

With continued reference to FIG. 1, as used in this disclosure, "user interface data structure" is a data structure representing a specialized formatting of data on a computer configured such that the information can be effectively presented for a user interface 124. In some cases, user interface data structure includes any data input by a user. In some cases, user interface data structure contains data and/or rules used to visualize the graphical elements within a user interface 124. In some cases, user interface data structure may include any data described in this disclosure. In some cases, user interface data structure may be configured to modify a user interface 124, wherein data with user interface data structure may be represented visually by the user interface 124. In some cases, user interface data structure may be continuously modified and/or updated by processor 108, wherein elements within user interface 124 or graphical user interface may be modified as a result. In some cases, processor 108 may be configured to transmit the user interface data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116. Processor 108 may further transmit the data above to a device display or another computing device 104.

With continued reference to FIG. 1, user interface 124 may contain an interaction component. "Interaction component" for the purposes of this disclosure is a device or a computer program that is capable of allowing a user to interact with user interface 124. Interaction component may include a button or similar clickable elements wherein the clicking of the button may initiate a response or a command. In some cases, interaction component may allow a user to input first user data 120 wherein interaction component may include a text box or clickable buttons that allow a user to input elements of user data 120 and/or interact with other visual elements. In some cases, interaction component may include visual data such as images, wherein selection of an image may indicate to processor 108 that a selection has been made. In some cases, interaction component may include visual illustrations of each compartment module 128 wherein selection of a compartment modules 128 may indicate to processor 108 that a selection has been made. In some embodiments, interaction component may include an event handler. As used in this disclosure, an "event handler" is an element that operates asynchronously once an event take place. In some cases, event handler may include routine, wherein the routine is a sequence of code that is intended to be called and executed repeatedly when component configuration interface module is running. In a non-limiting example, event handler may include a callback routine, wherein the callback routine may dictate one or more action that follows event. As used in this disclosure, an "event" is an action that take place when the user interacts with component configuration interface module, display, user interface 124, interaction component, and/or any other components/devices that user may interact with. For example, event may include, without limitation, clicking, holding, pressing, tapping, swiping and the like thereof. In some cases, event may include a plurality of actions. In other cases, event may involve other interactive devices such as, without limitation, mouse, keyboard, display, headphone, any other interactive device that either electrically and/or communicatively connected to computing device 104, and the like thereof. In a non-limiting example, user may interact with interaction component through performing an event on user interface 124, wherein the event may include user clicking a checkbox present on the visual interface. In some embodiments, event handler may utilize one or more application program interface (API) such as, without limitation, web events and the like thereof. Additionally, or alternatively, event handler may operate any processing step described in this disclosure.

With continued reference to FIG. 1, compartment configuration interface module 100 may further include a display device communicatively connected to at least a processor 108. "Display device" for the purposes of this disclosure is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to present GUI to a user, wherein a user may interact with GUI. In some cases, a user may view GUI through display.

With continued reference to FIG. 1, processor 108 may populate user interface data structure with one or more compartment modules 128 wherein user interface 124 is modified as a function of the one or more compartment modules 128. In some cases, processor 108 may generate and/or select one or more compartment modules 128 and populate user interface data structure wherein user interface 124 is modified and displays one or more compartment modules 128. In some cases, a user may interact with one or more compartment modules 128 wherein a user may select on a box associated with a compartment module 128, the box may include a photo of one or more compartment modules 128 wherein a user may visually view the one or more compartment modules 128. In some cases, each box may contain a particular description of each compartment module 128 such as a name, a color, a design and/or the like. In some cases, processor 108 may be configured to sort one or more compartment modules 128 based on a particular compartment categorization 132. For example, processor 108 may be configured to display a particular compartment categorization 132 and corresponding compartment modules 128. In some cases, a user may sort through particular compartment categorization 132 when interacting with user interface 124.

With continued reference to FIG. 1, processor 108 is configured to modify a user interface 124 as function of the one or more compartment modules 128 to generate a graphical view. The graphical view includes at least a display element generated as a function of one or more compartment modules 128. A "display element," as used in this disclosure, is an image that a program and/or data structure may cause to be displayed on a display of a device such as display device. Display elements may include, without limitation, windows, pop-up boxes, web browser pages, display layers, and/or any other display element that may occur to a person skilled in the art upon reviewing the entirety of this disclosure. Graphical view includes a first selectable graphic corresponding to a first selectable event handler. A "selectable graphic," as used in this disclosure, is a graphical element that upon selection using a cursor or other locator as manipulated using a locator device such as a mouse, touchscreen, track pad, joystick, or the like will trigger an action to be performed on compartment configuration interface module 100. In some cases, the actions may include operation of one or more event handlers. In some cases, one or more routines may be executed by an event handler when a selectable graphic is pressed. As a non-limiting example, events and/or routines associated with a selectable graphic may include a redirection link, defined as a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of selectable event graphic. Redirection may further include redirection to another step of the processing and/or other display windows within compartment configuration interface modules 100. Redirection may be performed using any event handler, including without limitation event handlers detecting the click of a mouse or other locator, access of redirection link using a touchscreen, the selection of any key, mouseover events, or the like. First selectable graphic is configured to trigger a first action if first selectable graphic is selected. First action may include instructions from processor 108 to receive compartment data 136 wherein compartment data 136 may include information relating to section of the first graphic. First action may further include one or more routines to modify user interface as a function of a selection of selectable graphic. First action may further include instructions to generate one or more configuration parameters as described below. First action may further include instructions to display information associated with each compartment module. For example, first action may include instruction to display a 'pop-up window' wherein the pop-up window may display elements of the compartment module such as dimensions, color, style, and the like. In some cases, graphical view may include more than one selectable graphics wherein selection of each selectable graphic may trigger an action to receive compartment data 136. In some cases, first action may include instructions to input data into compartment data 136 as a function of the selectable graphic. For example, first action may be configured to receive data of a compartment module 128 associated with a selectable graphic, wherein selection of the selectable graphic may indicate to processor 108 that a user is selecting a particular compartment module 136 to be received as compartment data 136. In some cases, first action may include instructions to receive configuration parameters 140 associated with a particular compartment module 128.

With continued reference to FIG. 1 processor 108 is configured to receive compartment data 136 associated with one or more compartment modules 128 in response to an input from the user interface 124. "Compartment data" for the purposes of this disclosure is particular characteristics of a compartment within compartment module 128 that may be modified. For example, compartment data 136 may include information relating to the positioning of a hinge on a cabinet, a determination of a flushed side and n exposed side of a cabinet, and the like. In some cases, compartment data 136 may include modifications to the length with and height of a compartment within compartment module 128. In some cases, compartment data 136 may further include modifications to a particular compartment such as changes to a portion of one or more sections of a compartment, changes in width depth and height of various components associated with the compartment and the like. In some cases, compartment data 136 may include a particular number of compartment modules 128. For example, a user may indicate that they are interested in several of the same compartment modules 128. In some cases, compartment data 136 may include selection and quantity of one of more compartment modules 128. For example, a user may indicate a user or an interest in four first compartment modules 128 and 5 second compartment modules 128. In some cases, compartment data 136 may further include data such as a flush section of a particular compartment wherein the flush surface may be positioned next to a flat surface. For example, the flush side of a compartment may be positioned on top of a compartment wherein the flush side may be next to a ceiling. In some cases, a user may interact with user interface 124 and select one or more compartment modules 128. In some cases, processor 108 may be configured to receive compartment data 136 through user input through user interface 124. For example, user interface 124 may include graphical icons denoting numerical values, characters, and the like wherein a selection of the graphical icon may be received as an input for compartment data 136. Continuing, a user may select an "L" wherein the "L" may indicate that the user prefers the compartment to contain a hinge on the left side. Similarly, a second "L" may denote the exposed side of the compartment to be located on the left side. In some instances, the user interface 124 may include a sliding scale having a numerical range wherein the user may interact with the numerical range to input a dimension of a compartment into compartment data 136. In some cases, processor 108 may receive thresholds for a particular compartment wherein a user may only modify a compartment within a particular threshold. For example, a user may not indicate the length of a compartment past a predetermined numerical value. Similarly, the length of the compartment may contain a minimum value wherein the user may not input data indicating a length below the threshold. In some cases each compartment within compartment module 128 may include a predetermined set of boundaries or thresholds wherein processor 108 may compare the data within compartment data 136 to the predetermined boundaries or thresholds. In some cases, user may interact with GUI wherein selection of a button and/or interaction with a text box may indicate to processor 108 a particular quantity of compartments desired within compartment module 128. In some cases, compartment data 136 may include area categorization wherein the area categorizations may include groupings of compartment modules 128 based on a particular area within a structure such as a house, a building, and the like. For example, one or more compartment modules 128 may be categorized to an area categorization associated with a kitchen wherein the user, and any other end users may determine the particular location for the compartments within compartment module 128. In some cases, are categorizations may include a first room a second room, a guest room, a master bedroom, a living room, a bathroom, a kitchen, a garage, a lunchroom, a working area and/or any other areas within a building or structure that may be separated based on functionality. In some case, a user may categorize each compartment module 128 to a particular area categorization. In some cases, processor 108 may be configured to receive an area categorization through user input and/or from user data 120 wherein and sort the compartment modules 128 based on the area categorization. In some cases, a user may associate each compartment module 128 with a unique identifier wherein the unique identifier may be used to sort the compartment modules 128.

In some cases, compartment data 136 may include digital and/or physical files that have been converted into a digital format. The files may include work orders, lists of materials and the like wherein processor 108 may receive the files and make determinations. In some cases compartment data 136 may further include design files such as 3D illustrations of a particular area containing one or more compartments, sketches, and the like.

With continued reference to FIG. 1, compartment data 136 may include data from files or documents that have been converted in machine-encoded test using an optical character reader (OCR). For example, a user may input digital records and/or scanned physical documents that have been converted to digital documents, wherein first attribute cluster 116 may include data that have bene converted into machine readable text. In some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 is configured to modify the user interface 124 as a function of compartment data 136. In some cases, processor 108 is configured to update the user interface data structure wherein the user interface 124 may receive compartment data 136 and display to a user an updated user interface 124 as a function of the compartment data 136. In some cases, user interface 124 may be configured to receive compartment data 136 through user input such as, for example, through selection of one or more compartment modules 128 and any other interactions that may signify to processor 108 that data has been received. In some cases, user interface data structure may be modified to include additional visual elements such as additional images, icons and the like. In some cases, receipt of compartment data 136 may indicate to processor to navigate the user to another window wherein the updated window may display elements associated with compartment configuration interface module 100. In some cases, user interface 124 may be modified to request new information such as configuration parameters. In some cases, user interface 124 may include checkboxes, selectable graphics and the like wherein a user may be instructed to input information through the user interface to be received as data. In some cases, user interface may be modified to visually present one or more configuration parameters 140 as described in further detail below wherein a user may select one or more configuration parameters 140. In some cases, processor may receive compartment data and generate one or more configuration parameters to be selected through user interface 124. In some cases, user interface may be updated to indicate to a user that compartment data has been received or properly received. In some cases, user interface may be modified to indicate receipt of compartment data 136. For example, user interface may visually display that a user has selected one or more compartment modules 128 and/or has inputted compartment data 136. In some cases, user interface 124 may navigate a user to another screen or window to indicate a next step in the processing.

With continued reference to FIG. 1, processor 108 is configured to generate one or more configuration parameters 140 as a function of compartment data 136 and the input. "Configuration parameters" for the purposes of this disclosure are add-ons or additional components that may be added to a compartment module 128. For example, configuration parameter 140 may include a sliding drawer, a waste disposal container, a spice rack, a cutlery holder, a reflective surface such as a mirror and the like. In some cases, configuration parameter 140 may further include a particular type of hinge associated with compartment module 128, a particular type of handle configured to access a section of the compartment and the like. In some cases, configuration parameter 140 may include the dimensions of the additional components such as the dimensions of the waste basket, the dimensions of the spice rack and the like. In some cases, configuration parameters 140 may include wine racks, glass doors, plate racks, lighting within sections of the compartment, various drawer inserts (e.g. inserts to hold or separate cans, cutlery, pots and pans and the like). In some cases configuration parameters 140 may further include hooks to hold various devices a user may place within the cabinet (e.g. lids, wine bottles pots, cutlery, knives, trash bags, oven mitts and the like). In some cases, configuration parameter 140 may further include particular types of fittings such as hinges, sliding tracks, slides and the like. In some cases, configuration parameter 140 may further include the assembly style of a compartment. This may include whether a compartment is assembled or unassembled. In some cases, a user may prefer to receive a compartment that is unassembled wherein the user may prefer to assemble the compartment at a later time.

With continued reference to FIG. 1, generating one or more configuration parameters 140 may include retrieving one or more configuration parameters 140 from database 116. In some cases, database 116 may include one or more sets of configuration parameters 140 wherein a particular set may be associated to a particular compartment module 128. In some cases, processor 108 may be configured to retrieve a set of configuration parameters 140 associated with a particular compartment module 128. In some cases, each configuration parameter 140 may be associated with a particular compartment threshold. "Compartment threshold" for the purposes of this disclosure is a predetermined set of ranges associated with a configuration parameter 140. For example, a particular configuration parameter 140 may contain a minimum compartment threshold of a particular length, wherein configuration parameter 140 may only be added or modified to compartment with said particular length. In another non limiting example, a configuration parameter 140 such as a trash bin may contain compartment threshold wherein the thresholds are determinative of a compartments minimum or maximum dimensions. In some cases, compartment threshold may be used to determine if a particular configuration parameter 140 may be added onto a particular compartment within compartment module 128. In some cases, compartment threshold may indicate that only certain sized configuration parameters 140 may be added or modified. For example, a particular compartment threshold may indicate that only trash bins of particular sizes may be added. In another non-limiting example, compartment threshold may indicate that a maximum of two drawers may be placed within a particular compartment. In some cases, each configuration parameter 140 may contain a predetermined set of thresholds. In some cases, processor 108 may be configured to retrieve the compartment thresholds from database 116. In some cases processor 108 may be configured to compare elements within compartment data 136 to one or more compartment thresholds wherein processor 108 may generate one or more configuration parameters 140 as a function of the compartment thresholds. For example, processor 108 may be configured to compare an element within compartment data 136 to a compartment threshold wherein a configuration parameter 140 may be selected for generation if the element within compartment data 136 does not exceed compartment threshold. In some cases, generating one or more configuration parameters 140 may include retrieving one or more configuration parameters 140 from a database 116 wherein database 116 may be populated in any way as described in this disclosure. In some cases, each compartment module 128 within compartment data 136 may include one or more associated configuration parameters 140. In some cases, processor 108 may be configured to retrieve one or more configuration parameters 140 using a lookup table wherein each compartment module 128 may be used to 'lookup' one or more configuration parameters 140. The lookup table may be populated by an operator of compartment configuration interface module 100, a third party, and the like. In some cases, the lookup table may be populated using a web crawler wherein a WebCrawler may be configured to lookup configuration parameters 140 associated with each compartment module 128.

With continued reference to FIG. 1, processor 108 may be configured to generate one or more configuration parameters 140 and/or any other data described in this disclosure using a rule-based system. "Rule-based system" also known as "rule-based engine" is a system that executes one or more rules such as, without limitations, such as a compartment rule in a runtime production environment. As used in this disclosure, a "compartment rule" is a pair including a set of conditions and a set of actions, wherein each condition within the set of conditions is a representation of a fact, an antecedent, or otherwise a pattern, and each action within the set of actions is a representation of a consequent. In a non-limiting example, compartment rule may include a condition of "when compartment dimensions within compartment data 136 are below" pair with an action of "Select one or more configuration parameters 140 associated with X". In some embodiments, rule-based engine may execute one or more compartment rules on data if any conditions within one or more compartment rules are met. Data may include configuration parameters 140, or any other data described in this disclosure. In some embodiments, compartment rules may be stored in database 116 as described in this disclosure. In some cases, compartment rule may include a rule such as "if compartment module 128 X is present within compartment data" and a corresponding action indicating "retrieve one or more configuration parameters 140 associated with Compartment X". In some cases, processor 108 may make determinations based on ranges of a particular compartment module 128 within compartment data 136. for example, processor 108 may make determinations based on given boundaries that a particular compartment may fall within. Particularly, if the dimensions of a compartment fall within a first boundary. A first set of configuration parameters 140 may be selected that are associated with X. In some cases, processor 108 may make calculations using an arithmetic logic unit within computing device 104. In some cases, processor 108 may calculate the total 'free space' within a given compartment wherein the free space may indicate a particular section within compartment that may be configured to hold one or more components. In some cases processor 108 may compare the size (e.g. length width height, volume etc.) to one or more configuration parameters 140 wherein only configuration parameters 140 that may fit within a particular area may be selected. In some cases, the size of the free space may determine the maximum size of a particular configuration parameter 140. For example, a cabinet having a free space of a particular size may be configured to house a trash bin of maximum size. In some cases, processor 108 may determine the size of free space and make determinations whether given components may be added, such as a sink, a drawer, a wine rack and the like. In some cases, processor 108 may calculate the size of a particular free space using the length, width and height of a given compartment and the thickness of various sidewalls within the compartment. In some cases, processor 108 may generate boundaries as a function of the free space wherein a user may select a particular configuration parameter 140 based on the boundaries. For example, a user may select a trash bin of varying sizes within a given range. In some cases, processor 108 may generate one or more configuration parameters as a function of a machine learning model. In some cases processor may be configured to retrieve training data having a plurality of compartment data associated with a plurality of configuration parameters. In some cases, the training data may be used to indicate that a particular compartment data is associated with one or more configuration parameters. The training data may be used to train the machine learning model, wherein one or more configuration parameters may be generated as a function of the machine learning model. The machine learning model and the training data may be generated in any way as described in this disclosure.

With continued reference to FIG. 1, elements of compartment data may be classified using a classifier such as a machine learning model. In some cases, elements within compartment data may be classified to configuration groupings. "Configuration groupings" for the purposes of this disclosure is a data set used to group similar elements that may be associated with a particular configuration parameter 140. Configuration groupings may include groupings such as trash bins, sliding drawers, rails, spice racks, wine racks and the like. In some cases, elements classified to a particular configuration grouping may indicate that the element and/or compartment module 128 is capable of incorporating a particular configuration parameter 140 associated with the grouping. In some cases, each element within compartment data 136 and/or each compartment module 128 within compartment data 136 may be classified to a configuration grouping. In some cases, compartment data 136 may be classified using a classifier machine learning model. In some cases classifier machine learning model may be trained using training data correlating a plurality of compartment data correlated to a plurality of configuration groupings. In an embodiment, a particular element (such as a compartment module 128) within compartment data may be correlated to a particular configuration grouping. In some cases, classifying compartment data may include classifying compartment data as a function of the classifier machine learning model. In some cases classifier training data may be generated through user input. In some cases, classifier machine learning model may be trained through user feedback wherein a user may indicate whether a particular element corresponds to a particular class. In some cases, classifier machine learning model may be trained using inputs and outputs based on previous iterations. In some cases, a user may input previous first compartment data and corresponding configuration groupings wherein classifier machine learning model may be trained based on the input. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In some cases, processor 108 may generate and train a classifier configured to receive compartment data and output one or more configuration groupings. Processor 108 and/or another device may generate a classifier using a classification algorithm, defined as a process whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 108 is further configured to modify the user interface 124 as a function of one or more configuration parameters 140. Modification may include a change of one or more windows within user interface 124. Modification may further include the display of one or more new elements such as one or more configuration parameters 140. Ins some cases, processor 108 is configured to generate one or more configuration parameters 140 and visually display them to a user. User interface 124 may allow for interaction of one or more configuration parameters 140, such as through selection of one or more selectable graphical element. In some cases, processor 108 may be configured to visually display one or more configuration parameter 140, wherein a user may view the one or more configuration parameters 140 and select a particular configuration parameter 140 to be added to a compartment within a compartment module 128. In some cases, processor 108 may modify user interface 124 to display graphical elements associated with one or more configuration parameters 140. In some cases, user interface 124 may allow for selection of configuration parameters 140 through interaction with user interface 124 such as selection of one or more buttons, interactions within a sliding scale and the like. In some cases, the user interface 124 may include a sliding scale in which a user may select a particular configuration of varying sizes within a given bound. For example, a user may select a particular configuration parameter 140 and interact with the sliding scale to select a particular volume of the configuration parameter 140. In some cases, each configuration parameter 140 may be displayed as boxes wherein the selection of each box may indicate to processor 108 to receive one or more configuration parameters 140. In some cases, user interface 124 may be modified in order to allow a user to input new information and to display new information. For example, user interface may include visual depictions of one or more configuration parameters. In some cases, processor 124 may receive compartment data 136 and display one or more configuration parameters 140 associated with elements within compartment data 136. For example, processor may be configured to display a particular compartment or compartment module, wherein a user may select configuration parameters 140 for the compartment module 140. In some cases, the user may select differing configuration parameters for each compartment module 128. In some cases, user interface 124 may be configured to display a particular compartment module and associated configuration parameters 140 associated with the compart module 124. In some cases, a user may select differing configuration parameters compartment module 128. In some cases, interaction with one or more display elements on user interface 124 may be indicative of an event wherein an event handler is configured to run one or more routines as a function of the interaction. For example, an event handler may be configured to indicate to processor to receive selections of configuration parameters. In some cases, the event handler may include instructions for processor to generate data as described below as a function of the selection. In some cases, processor 108 is configured to select at least one configuration parameter 140 of the one or more configuration parameters 140 in response to the input from the user interface 124. Processor 108 may receive input, such as, but not limited to interactions with one or more interaction components by a user, input of configuration parameters 140 and the like. In some cases, user interface data structure may be populated with one or more configuration parameters 140 wherein user interface 124 may receive data form the user interface data structure and visually display the configuration parameters 140.

With continued reference to FIG. 1, processor 108 is configured to generate a compartment data file 144 as a function of the user data 120, the compartment data 136 and the at least one configuration parameter 140. "Compartment data file" for the purposes of this disclosure is information relating to user data 120, compartment data 136 and the one or more configuration parameters 140 and the association amongst the user data 120, the compartment data 136 and the one or more configuration parameters 140. In some cases, compartment data file 144 may include an invoice wherein the invoice may indicate a compartment, its sizes, its modifications, and any add-ons. In some cases, compartment data file 144 may include one or more compartments associated with one or more compartment modules 128 wherein each compartment may contain particular sizes, dimensions, modifications additional features and the like. In some cases, compartment data file 144 may include a temporal element 148 wherein the temporal element 148 is information indicating the amount of time it may take to manufacture the compartments mentioned within compartment data file 144. In some cases, each configuration parameter 140 and/or each element within compartment data 136 may include a temporal element 148. In some cases, compartment data file 144 may include a summation of all temporal elements 148 associated with one or more configuration parameters 140 and compartment module 128 wherein the summation may indicate an overall time for the compartments to be delivered. In some cases, each compartment module 128 may include an associated temporal element 148 wherein the summation of all the temporal elements 148 may indicate the total time it may take for all the elements within compartment data file 144 to be ready. In some cases, the temporal elements 148 may be associated with an end user, wherein the end user may assign temporal elements 148 with each element in compartment data file 144. In some cases, processor 108 may be configured to receive one or more temporal elements 148 from a lookup table, wherein the lookup table may be retrieved on a database 116. In some cases, generating compartment data file 144 may include combining elements within user data 120, compartment data 136 and configuration parameters 140. In some cases, compartment data file 144 may include user data 120 such as the address of a user, a logo associated with the user, financial information associated with the user and the like. In some cases, compartment data file 144 may include information relating to an end user such as a manufacturer and the like. In some cases, compartment data file 144 may include a projected manufacturing date. In some cases, compartment data file 144 may include one or more configuration parameters 140 and an associated quantitative element 152. In some cases, each element within compartment data file 144 may include an associated quantitative element 152. For example, a particular set of dimensions or a particular color within compartment data 136 may include an associated quantitative element 152 such as a number indicating a price deviation. In some cases, processor 108 may be configured to add up the associated quantitative elements 152 in order to receive a final quantitative indicator, wherein the quantitative indicator may be used to determine a pricing of all the elements within compartment data file 144. In some cases, processor 108 may perform calculations wherein each element within compartment data file 144 may be used to determine one or more quantitative elements 152 as a function of the calculations. For example, processor 108 may receive one or more algorithms, wherein the algorithms may be used to compute a price of a particular paint color, a price of one or more components and a price of one or more configuration parameters 140. In some cases, processor 108 may receive the algorithms from database 116 wherein each set of algorithms may be associated to another end user. For example, a first manufacturer may contain their own pricing model whereas a second manufacturer may contain a differing pricing model. In some cases, elements within compartment data file 144 may be associated with one another wherein addition of a second configuration parameter 140 may affect the quantitative element 152 of the first parameter. Similarly, selection of a second configuration parameter 140 may affect the temporal element 148 of a first configuration parameter 140. For example, selection of a second configuration parameter 140 may modify the pricing associated with the first configuration parameter 140 and the overall time frame needed for manufacture. In some cases, each compartment may contain a predetermined temporal element 148 wherein modification or additional components may not affect the temporal element 148. In some cases, each configuration parameter 140 may include an associated quantitative element 152 wherein compartment data file 144 may include the total price by summing up the quantitative elements 152. In some cases, processor 108 may be configured to modify the quantitative elements 152 based on predetermined thresholds. For example, if a total price exceeds a predetermined threshold, processor 108 may be configured to modify the total pricing, such as by adding discounts. In some cases, temporal elements 148 within compartment data file 144 may be used to calculate a date of arrival of a particular product. For example, if the summation of all the temporal elements 148 may indicate that a product will take five business days, processor 108 may be configured to generate a date of arrival within 5 business days.

With continued reference to FIG. 1, processor 108 may be configured to populate a template as a function of the compartment data file 144. For example, processor 108 may be configured to populate an invoice, wherein each element within compartment data file 144 may contain an associated section within the invoice. In some cases, compartment data file 144 may be used to record keeping, generating invoices and transmitting communications about one or more compartments within compartment data file 144.

In some cases, compartment data file 144 may include information relating to an end user where in the end user is a manufacturer or a producer that is capable of manufacturing or producing the compartments within compartment data file 144. In some cases, the data may include a name, address, phone numbers and the like.

With continued reference to FIG. 1, in some cases, processor 108 may be configured to generate more than one compartment data files 144 wherein each compartment data file 144 is associated with an end user. For example, processor 108 may be configured to generate more than one compartment data files 144 wherein each compartment data file 144 is associated with a particular distributor or manufacturer. In some cases, each compartment data file 144 may include quantitative elements 152 and/or temporal elements 148 associated with each end user. In some cases processor 108 may generate one or more compartment data files 144 containing differing quantitative elements 152 and/or temporal elements 148 associated with each end user and select a particular compartment data file 144 that best meets the needs of the user. For example, processor 108 may be configured to select the compartment data file 144 that contains the lowest price. In another non-limiting example, processor 108 may be configured to select the compartment data file 144 associated with the lowest manufacturing time or production time. In some cases, processor 108 may be configured to retrieve the geographical location of one or more end users and select the compartment data file 144 associated with an end user having the shortest distance. In some cases, database 116 may contain a plurality of quantitative elements 152 and/or temporal elements 148 associated with one or more elements within compartment data file 144 wherein each of the plurality of quantitative elements 152 and/or temporal elements 148 are associated with a particular end user. In some cases, processor 108 may be configured to generate multiple compartment data files 144 and select the compartment data file 144 with the lowest value, the lowest turnaround time, the shortest distance and the like. In some cases, user data 120 may indicate to processor 108 that the user prefers a particular objective, such as lowest cost, lowest turnaround time and the like wherein processor 108 may be configured to select a compartment date file as a result. In some case, each compartment data file 144 may include at least one component parameter and an associated quantitative element 152, wherein the quantitative elements 152 may stay the same or differ amongst compartment data files 144.

With continued reference to FIG. 1, processor 108 may be configured to generate a compartment data file 144 as a function of a machine learning model. Processor 108 may use a machine learning module, such as a compartment machine learning module for the purposes of this disclosure, to implement one or more algorithms or generate one or more machine-learning models, such as a compartment machine learning model, to calculate at least one compartment data files 144. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such compartment module 128, may be used to generate compartment machine learning model and/or any other machine learning model using training data. compartment machine learning model may be trained by correlated inputs and outputs of training data. Training data may be data sets that have already been converted from raw data whether manually, by machine, or any other method. Compartment training data may be stored in database 116. Compartment training fata may also be retrieved from database 116.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database 116, such as any database 116 described in this disclosure, or be provided by a user such as a prospective employee, and/or an employer and the like. In other embodiments, machine-learning module may obtain a training set by querying a communicatively connected database 116 that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1, generating compartment data file 144 may include receiving compartment training data. compartment training data may include a plurality of user data 120, compartment data 136 and/or configuration parameters 140 associated with a plurality of compartment data files 144. For example, compartment training data may be used to show that a particular combination of user data 120, compartment data 136 and/or configuration parameters 140 may indicate a particular compartment data file 144. Compartment data file 144 may indicate costs, times frames, end users and the like. In some embodiments, compartment training data may be received from a user, third party, database 116, external computing device 104s, previous iterations of processing, and/or the like as described in this disclosure. compartment training data may further be comprised of previous iterations of compartment data files 144. Compartment training data may be stored in database 116 and/or retrieved from database 116. In some cases, generating compartment data file 144 includes training compartment machine learning model as a function of compartment training data and generating compartment data file 144 as a function of the energy machine learning model.

With continued reference to FIG. 1, processor 108 is configured to generate a modified compartment data file 156. "Modified compartment data file" for the purposes of this disclosure is a compartment data file 144 having modified quantitative and/or temporal elements 148 as a function of a predetermined multiplier or a predetermined numerical amount. For example, modified compartment data file 156 may include a higher total price such as a 20% increase or an increase of a specified predetermined amount. In some cases, processor 108 may be configured to multiply the quantitative element 152 or the final amount with a predetermine multiplier such as 20%, 30%, 40% and the like. Similarly, processor 108 may be configured to add more time to the temporal element 148 such as the addition of a day or two multiplications of the temporal element 148 to increase the overall time for the compartments to be ready. In some cases, processor 108 may retrieve calculation and/or algorithm configured to modify the temporal elements 148 and/or the quantitative elements 152 within modified compartment data file 156. In some cases, the calculations may be received by user input, such as by a user inputting that the multiplier should be 1.2×, 1.3× and the like. In some cases, modified compartment data file 156 may include a differing end user such as a consumer. In some cases, modified compartment data file 156 may be configured to be sent to a customer or consumer as a bill.

With continued reference to FIG. 1, processor 108 is configured to transmit compartment data file 144 to first end user 160. In some cases, first end user 160 may include a manufacturer, a producer, and the like. In some cases, first end user 160 may be any person or entity in which a user seeks to make interaction with. In some cases, first end user 160 may include multiple individuals, such as multiple manufacturers, multiple employees, and the like. In some cases, processor 108 may further be configured to transmit modified compartment data file to a second end user 164. Second end user 164 may include a consumer, a customer, a prospective customer, an employee and/or any person in which a person seeks to make communication within. In some cases, user data 120 may include information relating to a second end user 164, wherein processor 108 may be configured to generate modified compartment data file 156 as a function of the user data 120.

Figure 2:
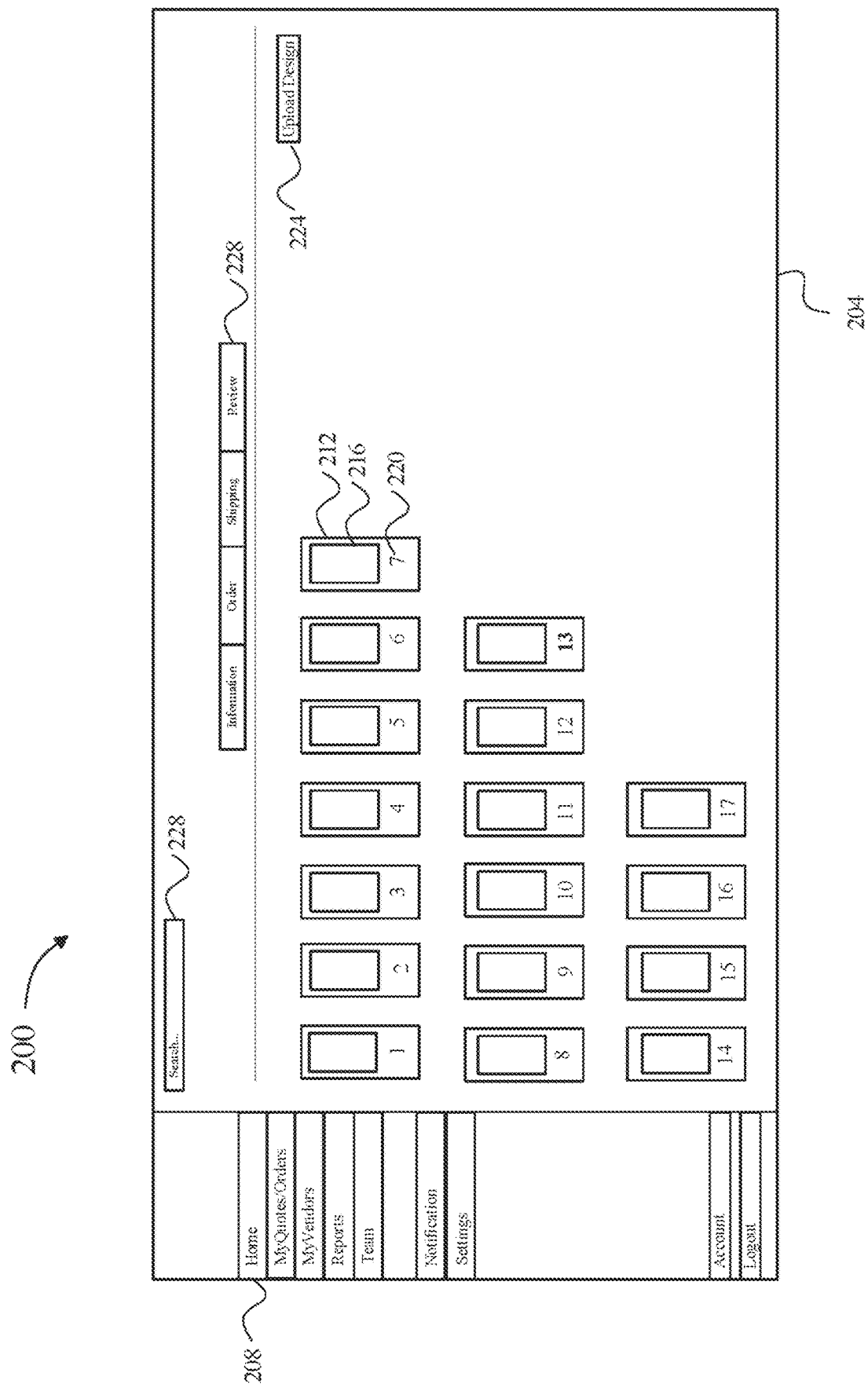
FIG. 2 is an exemplary embodiment of a user interface in accordance with this disclosure.

Referring now to FIG. 2, an exemplary embodiment of a user interface 200 is described in accordance with the subject disclosure. In some cases, user interface 200 includes window 204. A "window" for the purposes of this disclosure is the information that is capable of being displayed within a border of device display. A user may navigate through different windows 204 wherein each window 204 may contain new or differing information or data. For example, a first window 204 may display information relating to user data wherein a user may be requested to input user data such as a username and password, whereas a second window may display information relating to the compartment modules. A user may navigate through a first second, third and fourth window (and so on) by interacting with user interface. For example, a user may select a button or a box signifying a next window on user interface 200, wherein the pressing of the button may navigate a user to another window 204. In some cases, user interface 204 may further contain event handlers, wherein the placement of text within a textbox may signify to computing device to display another window. In some cases, user interface may include navigation components 208 wherein selection of a navigation component may direct a user to another window 204. For example, a user may select a 'home button' to view the compartment modules. In another non limiting example, a user may select the "My quotes/orders" navigation component 208 wherein a user may view previously generated data. In some cases, user interface may contain modules 212 wherein the modules may describe one or more components such as compartment modules as described in this disclosure. In some cases, modules 212 may be consistent with compartment modules as described above. In some cases, each module 212 may contain a display element 216. The display element 216 may be configured to display graphical icons, images and the like that may be used to describe module 212. For example, display element 216 may contain an image of a cabinet with a particular color wherein a user may deduce that the module is associated with a particular cabinet with a particular color. In some cases, module may further include a descriptor 220 wherein the descriptor may be used to describe the particular module 212. In some cases, each module may be associated with one or more even handlers wherein selection of a module 212 may signify to computing device that one or more actions should take place, such as the receiving of data. In some cases, a user may opt to inset their own module through an upload feature 224 wherein the upload feature 224 may allow a user to input or select modules that are not displayed on user interface. In some cases, a user may search through modules 220 using search box 228 wherein a user may input descriptive information to retrieve one or more modules. For example, a user may search "7" wherein computing device may be configured to retrieve a module 212 associated with the number 7. In some cases user interface may further include an identification field 228 wherein the identification field 228 may signify to a user where they are in the current processing. For example, a user may be put on notice that the computing device may be receiving information, or a user may be put on notice that various modules have been selected and now the user is required to input shipping information. In some cases, identification field 228 may be associated with one or more event handlers wherein selection of a particular section of identification field 228 may signify to computing device to return to an earlier or later section of the processing. For example, a user may skip forward and input information such as an address. In other cases, a user may go back and select one or more modules 212.

Figure 3:
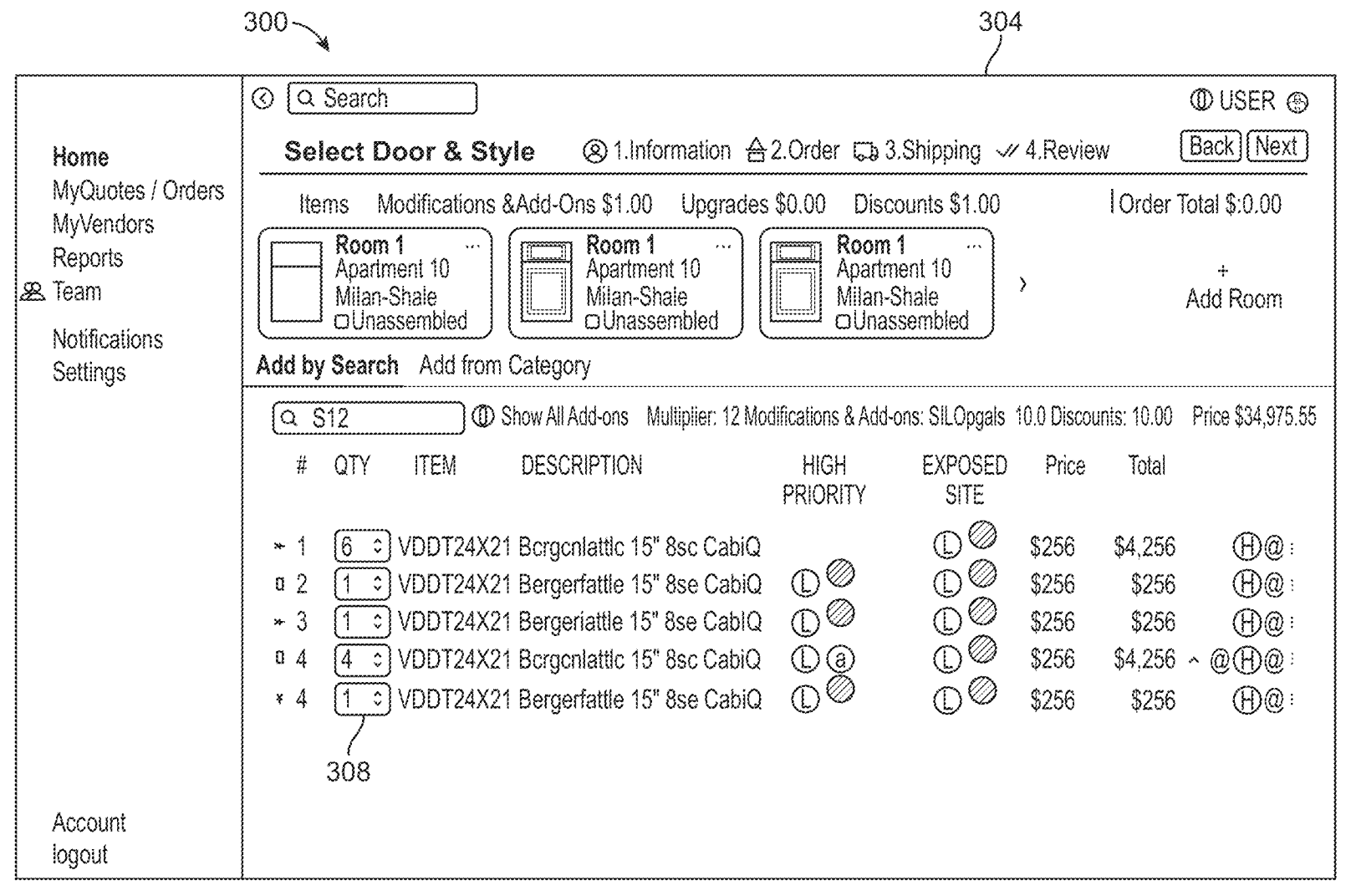

Referring now to FIG. 3, yet an exemplary embodiment of a user interface 300 is described in accordance with the subject disclosure. In some cases, user interface may contain multiple display windows 304 Each display window may be configured to display one or more elements generated by processor. In this instance, display window 304 may display element associated with compartment data as described in this disclosure. This may include but is not limited a particular number of compartment modules selected, and any modifications made to the compartment modules, such as, but not limited, selection of a location of one or more hinges, selection of a location one or more exposed sides. In some cases, user interface 300 may be configured to receive compartment data wherein a user may interact within user interface to input data. For example, the user may input a particular quantity within comment box 308 wherein the comment box is configured to be received as compartment data. In some cases, user interface 300 may contain multiple comment boxes 308 wherein each comment box 308 may be associated with a particular compartment module as described above. In some cases, user interface 300 may be modified based on user input wherein selection or input of one or more control modules may update user interface to display the selections.

Figure 4:
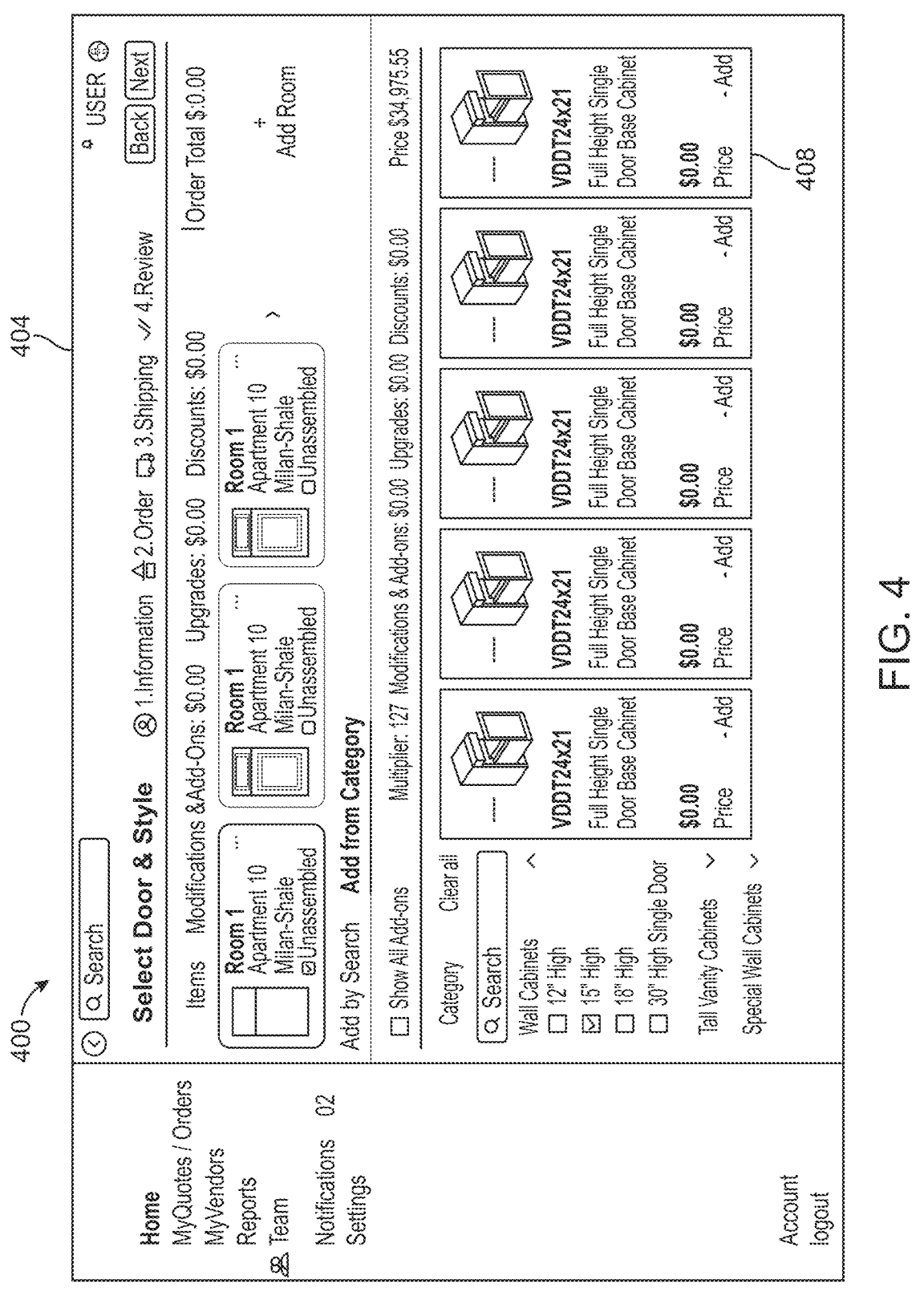

Referring now to FIG. 4, yet another exemplary embodiment of a user interface 400 is described in accordance with the subject disclosure. In this instance view window may display one or more configuration parameters 408 as described above. A user may select on a particular configuration parameter 408 to be associated with a particular compartment module. IN some cases, each configuration parameter 408 may be selected for a particular compartment module. In some cases, user interface may be updated to reflect the selections such as by visually displaying a check box with the configuration parameter that has been selected.

Referring now to FIG. 5, yet another exemplary embodiment of a user interface 500 is described in accordance with the subject disclosure. In this instance, view window 504 may be configured to display information relating to compartment data file as described above. The information may include but is not limited to, pricing, shipping, the particular end user, the information associated with the end user and the like. In some cases, compartment data file may further include the weight of the compartments selected, the total volume of the compartments selected and the like.

Figure 6:
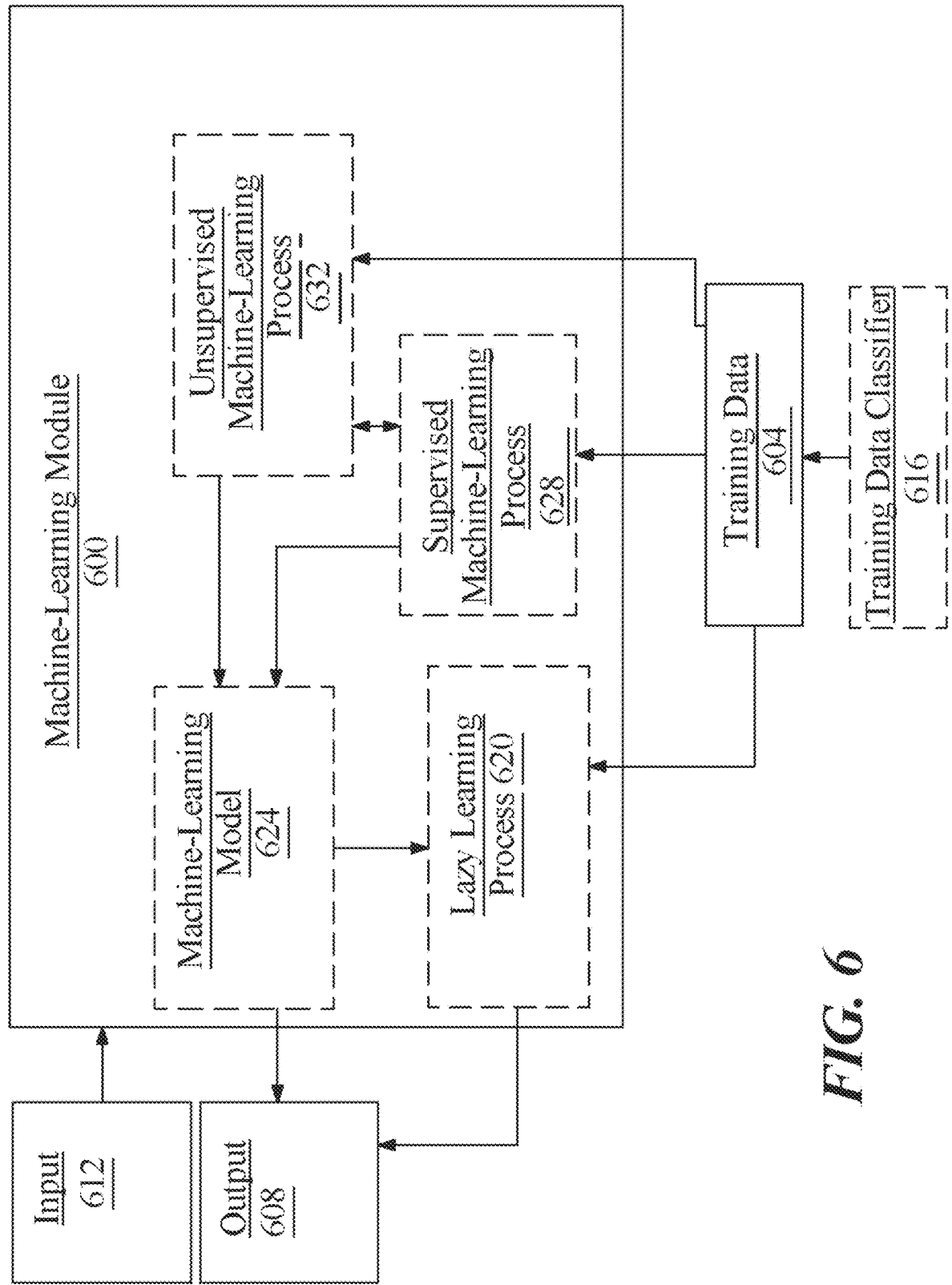
FIG. 6 is a block diagram of exemplary embodiment of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to subgroups of compartments such as dressers, sinks, cabinets and the like.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user data, compartment data and/or one or more configuration parameters as described above as inputs, compartment data file as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 662. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 7:
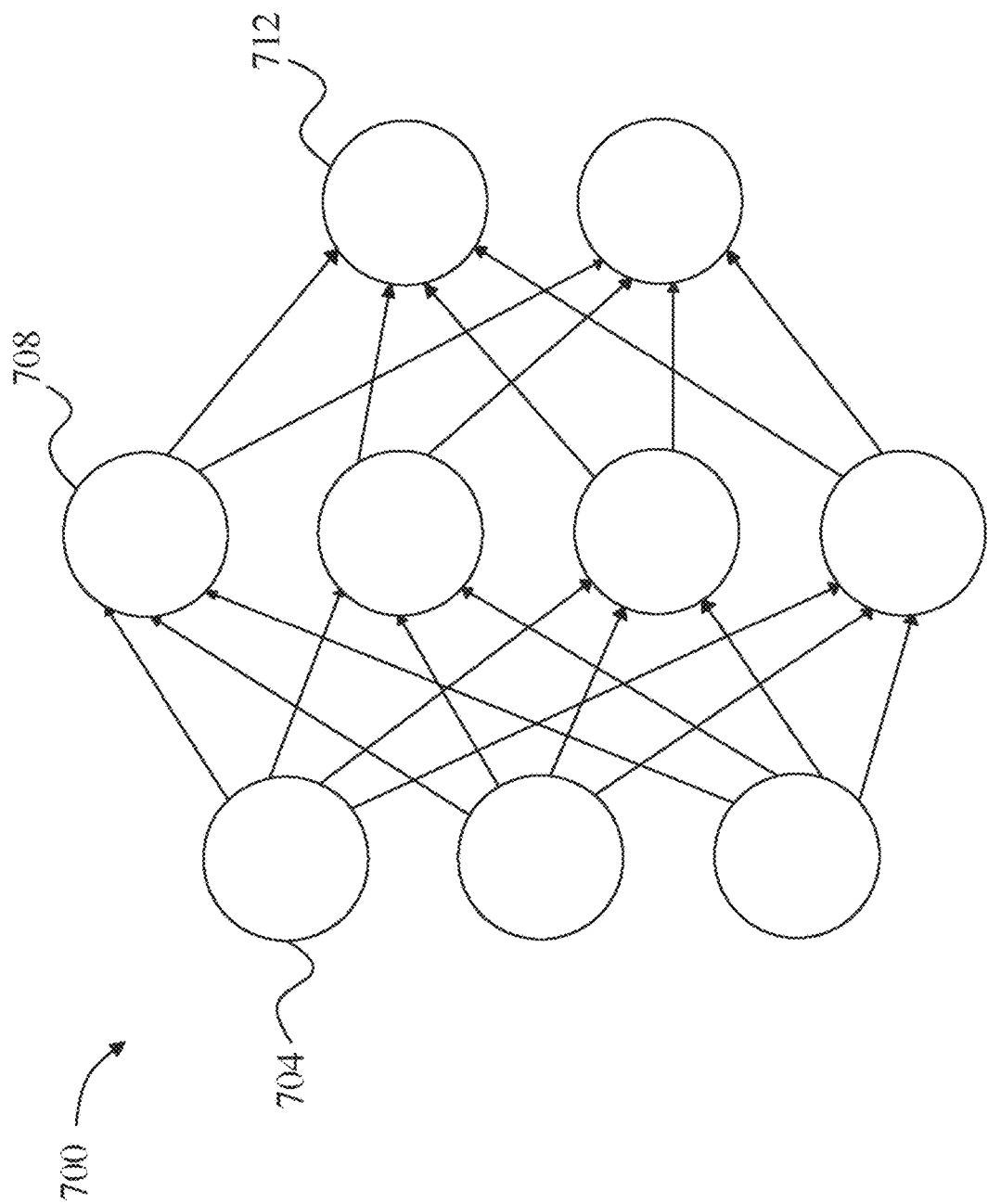
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
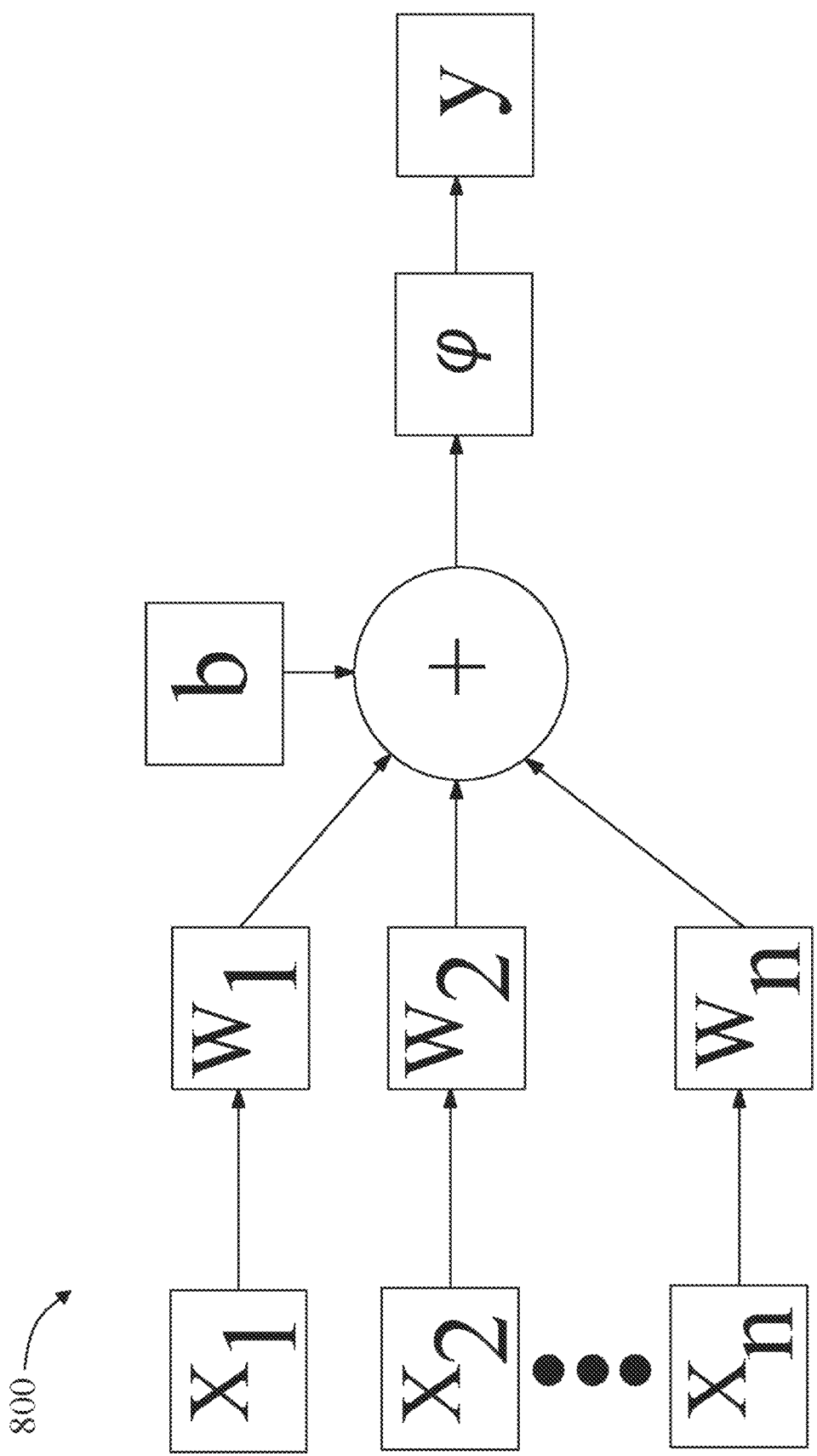
FIG. 8 is a block diagram of an exemplary embodiment of a node of a neural network.

Referring now to FIG. 8, an exemplary embodiment of a node 800 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*sigmoid(x)$, a Gaussian error linear unit function such as $f(x)=a(1+tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
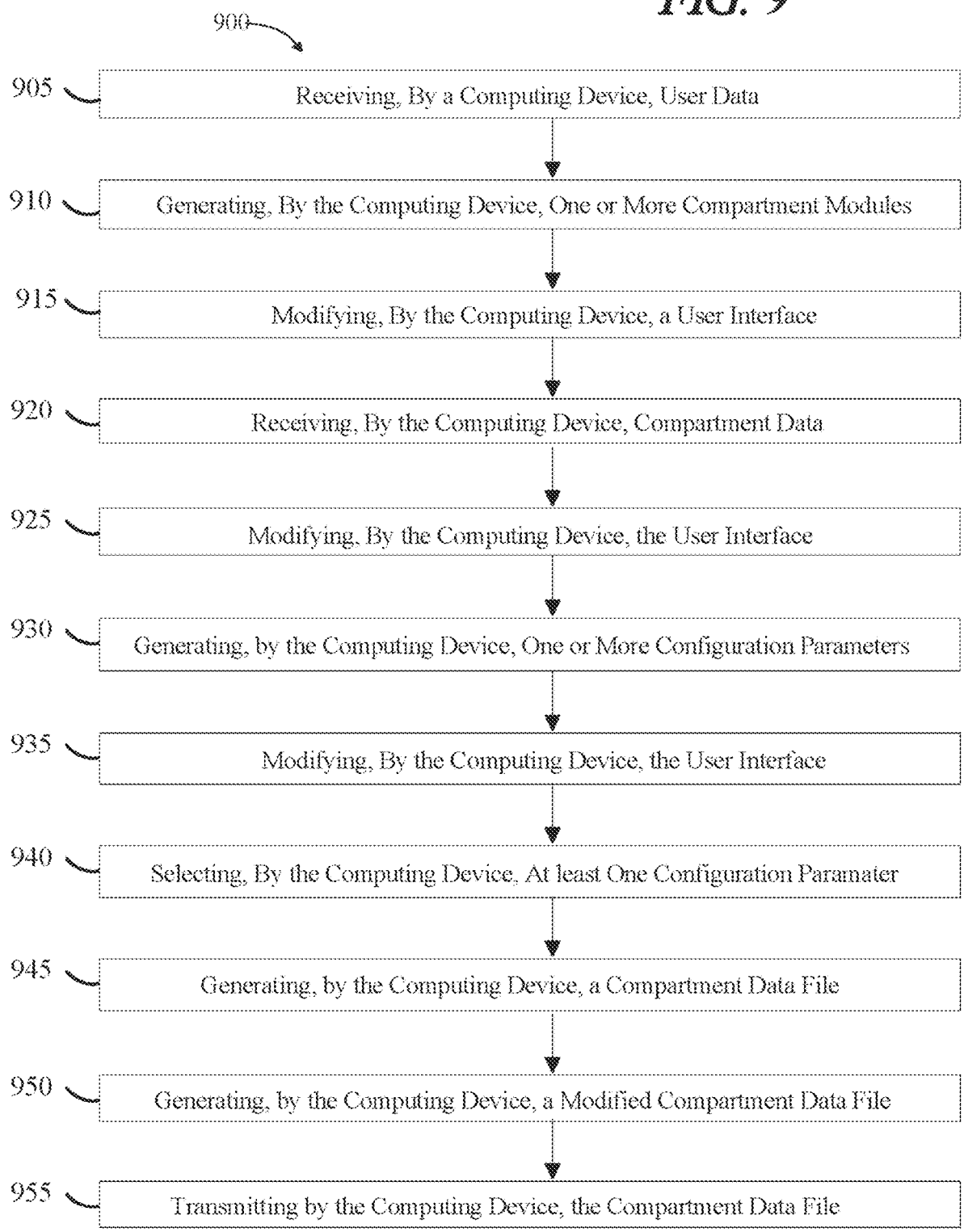
FIG. 9 is a flow diagram illustrating an exemplary embodiment of a method of use for a compartment configuration interface module.

Referring now to FIG. 9, a method 900 of use of a compartment configuration interface modules is described. At step 905, method 900 includes receiving, by a computing device, user data. in some cases, receiving, by the computing device, user data includes receiving user data from a database. In some cases, the user data includes information relating to a second end user 194. In some cases, receiving, by the computing device, user data further includes receiving a username and password associated with the user as an input from the user interface. This may be implemented with reference to FIGS. 1-9.

With continued reference to FIG. 9, at step 910, method 900 includes generating, by the computing device, one or more compartment modules as a function of the user data. In some cases the one or more compartment modules include visual data. In some cases, at least one compartment module of the one or more compartment modules comprises a compartment categorization. This may be implemented with reference to FIGS. 1-9.

With continued reference to FIG. 9, at step 915, method 900 includes modifying, by the computing device, a user interface as a function of the one or more compartment modules to generate a graphical view, wherein the graphical view includes at least a display element generated as a function of the one or more compartment modules, and a selectable graphic corresponding to a first selectable event handler, wherein the first selectable event handler is configured to trigger a first action if the first selectable graphic is selected. This may be implemented with reference to FIGS. 1-9.

With continued reference to FIG. 9, at step 920, method 900 includes receiving, by the computing device, compartment data associated with one or more compartment modules in response to an input from a user interface. This may be implemented with reference to FIGS. 1-9.

With continued reference to FIG. 9, at step 925, method 900 includes modifying, by the computing device, the user interface as a function of the compartment data. This may be implemented with reference to FIGS. 1-9.

With continued reference to FIG. 9, at step 930, method 900 includes generating, by the computing device, one or more configuration parameters as a function of the compartment data and the input. This may be implemented with reference to FIGS. 1-9.

With continued reference to FIG. 9, at step 935, method 900 includes modifying, by the computing device, the user interface as a function of the one or more configuration parameters. This may be implemented with reference to FIGS. 1-9.

With continued reference to FIG. 9, at step 940, method 900 includes selecting, by the computing device, at least one configuration parameter of the one or more configuration parameters in response to the input from the user interface. This may be implemented with reference to FIGS. 1-9.

With continued reference to FIG. 9, at step 945, method 900 includes generating, by the computing device, a compartment data file as a function of the user data, the compartment data, at the at least one configuration parameter. In some cases, the compartment data file includes the one or more configuration parameters and an associated quantitative element. In some cases, generating, by the computing device, the compartment data file includes generating more than one compartment data files, wherein each compartment data file of the more than one compartment data files is associated with an end user, and wherein each compartment data file of the more than one compartment data files contains at least one configuration parameter and an associated quantitative element, and selecting one of the more than one compartment data files. In some cases, the compartment data file includes a temporal element. This may be implemented with reference to FIGS. 1-9.

With continued reference to FIG. 9, at step 950, method 900 includes generating, by the computing device, a modified compartment data file as a function of the compartment data file. This may be implemented with reference to FIGS. 1-9.

With continued reference to FIG. 9, at step 955 method 900 includes transmitting, by the computing device, the compartment data file to a first end user. In some cases, the method further includes transmitting, by the computing device, the modified compartment data file to a second end user. This may be implemented with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
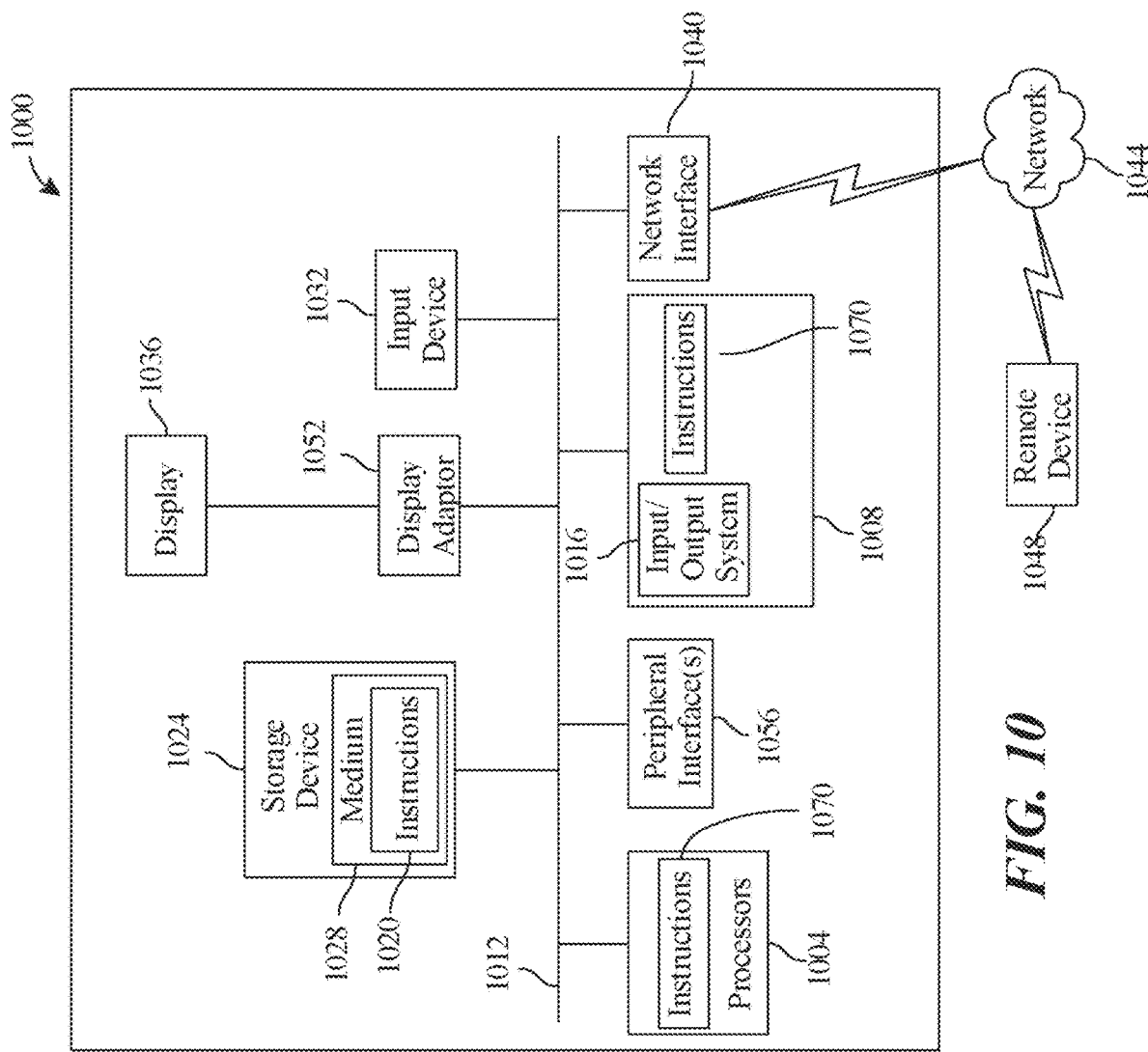
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A compartment configuration interface module, the compartment configuration interface module comprising;
    a processor; and
    a memory communicatively connected to the processor, the memory containing instructions configuring the processor to:
    receive user data;
    generate one or more compartment modules as a function of the user data;
    modify a user interface as a function of the one or more compartment modules to generate a graphical view, wherein the graphical view comprises:
        at least a display element generated as a function of the one or more compartment modules; and
        a selectable graphic corresponding to a first selectable event handler, wherein the first selectable event handler is configured to trigger a first action if the first selectable graphic is selected;
    receive compartment data associated with the one or more compartment modules in response to an input from the user interface;
    modify the user interface as a function of the compartment data;
    generate one or more configuration parameters as a function of the compartment data and the input;
    modify the user interface as a function of the one or more configuration parameters;
    select at least one configuration parameter of the one or more configuration parameters in response to the input from the user interface;
    generate a compartment data file as a function of the user data, the compartment data, and the at the at least one configuration parameter, wherein generating the compartment data file comprises:
        generating a plurality of compartment data files, wherein each compartment data file of the plurality of compartment data files is associated with an end user, and wherein each compartment data file includes at least one configuration parameter and an associated quantitative element; and
        selecting at least one of the plurality of compartment data files;
    generate a modified compartment data file as a function of the compartment data file; and
    transmit the compartment data file to a first end user.

2. The compartment configuration interface module of claim 1, wherein receiving the user data comprises receiving the user data from a database.

3. The compartment configuration interface module of claim 1, wherein the processor is further configured to transmit the modified compartment data file to a second end user.

4. The compartment configuration interface module of claim 3, wherein the user data comprises information relating to the second end user.

5. The compartment configuration interface module of claim 1, wherein the compartment data file comprises the one or more configuration parameters and an associated quantitative element.

6. The compartment configuration interface module of claim 1, wherein the compartment data file comprises a temporal element.

7. The compartment configuration interface module of claim 1, wherein receiving the user data further comprises receiving a username and password associated with the first end user as an input from the user interface.

8. The compartment configuration interface module of claim 1, wherein at least one compartment module of the one or more compartment modules comprises a compartment categorization.

9. The compartment configuration interface module of claim 1, wherein the one or more compartment modules comprise visual data.

10. A method of use of a compartment configuration interface module, the method comprising:
  receiving, by a computing device, user data;
  generating, by the computing device, one or more compartment modules as a function of the user data;
  modifying, by the computing device, a user interface as a function of the one or more compartment modules to generate a graphical view, wherein the graphical view comprises:
    at least a display element generated as a function of the one or more compartment modules; and
    a selectable graphic corresponding to a first selectable event handler, wherein the first selectable event handler is configured to trigger a first action if the first selectable graphic is selected;
  receiving, by the computing device, compartment data associated with the one or more compartment modules in response to an input from a user interface;
  modifying, by the computing device, the user interface as a function of the compartment data;
  generating, by the computing device, one or more configuration parameters as a function of the compartment data and the input;
  modifying, by the computing device, the user interface as a function of the one or more configuration parameters;
  selecting, by the computing device, at least one configuration parameter of the one or more configuration parameters in response to the input from the user interface;
  generating, by the computing device, a compartment data file as a function of the user data, the compartment data, and the at the at least one configuration parameter, wherein generating the compartment data file comprises:
    generating a plurality of compartment data files, wherein each compartment data file of the plurality of compartment data files is associated with an end user, and wherein each compartment data file includes at least one configuration parameter and an associated quantitative element; and
    selecting at least one of the plurality of compartment data files;
  generating, by the computing device, a modified compartment data file as a function of the compartment data file; and
  transmitting, by the computing device, the compartment data file to a first end user.

11. The method of claim 10, wherein receiving, by the computing device, the user data comprises receiving the user data from a database.

12. The method of claim 10, the method further comprising transmitting, by the computing device, the modified compartment data file to a second end user.

13. The method of claim 12, wherein the user data comprises information relating to the second end user.

14. The method of claim 10, wherein the compartment data file comprises the one or more configuration parameters and an associated quantitative element.

15. The method of claim 10, wherein the compartment data file comprises a temporal element.

16. The method of claim 10, wherein receiving, by the computing device, the user data further comprises receiving a username and password associated with the first end user as an input from the user interface.

17. The method of claim 10, wherein at least one compartment module of the one or more compartment modules comprises a compartment categorization.

18. The method of claim 10, wherein the one or more compartment modules comprise visual data.

\* \* \* \* \*